No. 869,530. PATENTED OCT. 29, 1907.
T. SMITH.
FLUSHING CISTERN.
APPLICATION FILED OCT. 30, 1906.
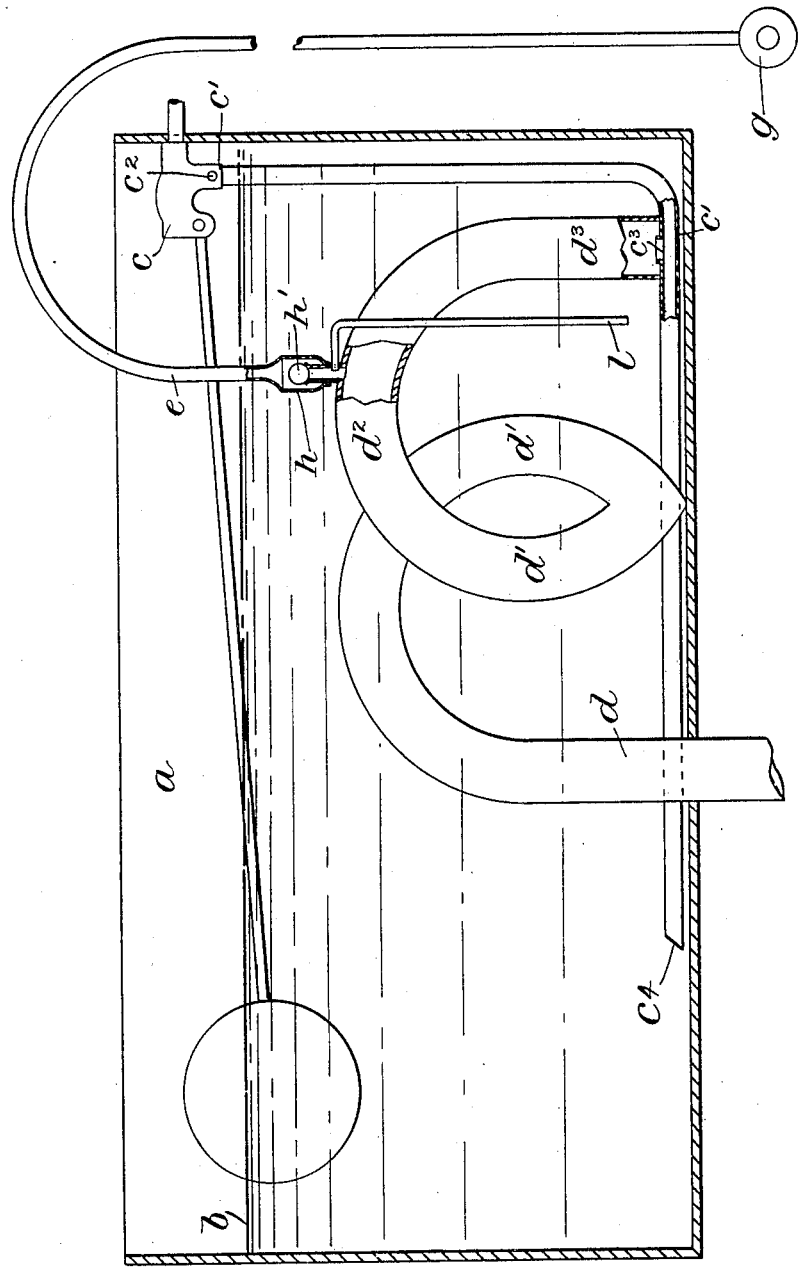
WITNESSES
W. P. Burke
H. W. Sierich
INVENTOR
Thomas Smith
BY Richardson
ATTYS.

UNITED STATES PATENT OFFICE.

THOMAS SMITH, OF SOUTH YARRA, VICTORIA, AUSTRALIA, ASSIGNOR OF ONE-HALF TO MARK YINDER, OF SOUTH YARRA, VICTORIA, AUSTRALIA.

FLUSHING-CISTERN.

No. 869,530.   Specification of Letters Patent.   Patented Oct. 29, 1907.

Application filed October 30, 1906. Serial No. 341,331.

*To all whom it may concern:*

Be it known that I, THOMAS SMITH, a subject of the King of Great Britain, residing at 20 Great Davis street, South Yarra, in the State of Victoria, Australia, have invented certain new and useful Improvements in Flushing-Cisterns; and I do declare the following to be a full, clear, and exact description of the invention, such as will enable others skilled in the art to which it appertains to make and use the same.

The invention consists essentially in making an apparatus for flushing purposes which is actuated by opening a valve to release imprisoned air, consequently doing away with any necessity for chains or levers to the tank or cistern.

The apparatus when constructed and arranged in the manner hereinafter described is for the purpose of flushing water closets, urinals, sinks and the like.

In order that the invention may be understood I will describe same with reference to the accompanying drawings:—

$a$ represents the cistern which is filled to the required height $b$, in the ordinary manner by the ball tap $c$.

$d$ is a pipe which conducts the water from the cistern to the fitting to be flushed. A portion of said pipe $d$ is bent to form a coil or double trap $d'$, $d'$, $d^2$, $d^3$. The end of $d^2$ terminates in an open mouth. The top of coil is a little (say about two inches in an ordinary water closet cistern) below the water line $b$. From $d^2$ a tube $e$ is led away and terminates in cock or valve $g$. The bore in the said tube $e$ and the said valve $g$ is sufficiently large to allow the imprisoned air to escape in reasonable time from air lock $d^2$ but not large enough to allow sufficient air in to stop siphonic action:—But if it should be desirable to have a larger bore the valve $g$ could be constructed to allow the egress of air and not the ingress or an automatic valve $h$ could be inserted in tube $e$ for the same purpose. This valve may be formed with a ball $h'$ to rise or fall from or to a seat formed for the purpose. The valve $g$ is preferably made self closing.

From pipe $e$ below valve $h$ a branch pipe $l$ is taken and carried below seal of trap $d'$, to admit air to $d^2$ before the cistern is quite empty, for the purpose of completely stopping siphonic action, and preventing the sucking noise common to flushing cisterns.

The conduit pipe $c'$, of ball tap $c$, is constructed with an inlet orifice $c^2$ and two outlet orifices $c^3$ and $c^4$, so that when the water is flowing through $c'$ the said water sucks in air at $c^2$ and conveys it to and past leg $d^3$ of coil through the orifices $c^3$ and $c^4$. Should too large a quantity of air be conveyed to leg $d^3$ while the cistern is flushing, the siphonic action would be stopped, to prevent this the conduit $c'$ is carried to and past the leg $d^3$ for the following reasons:—If there should be a low pressure of water flowing through the conduit the whole or nearly the whole of the air would pass through the first orifice $c^3$ and into leg $d^3$, which air would be sufficient to recharge air lock and yet not sufficient to stop siphonic action should the cistern be flushing—should there be a high pressure of water flowing through $c'$ more than sufficient air to stop siphonic action would pass through with the water into cistern, and siphonic action would be stopped if it were all delivered at $c^3$, but the velocity of the water would carry nearly the whole of the air past the first orifice $c^3$ to second orifice $c^4$, where it would discharge into cistern well clear of the leg $d^3$ and thus be powerless to stop siphonic action.— Should the velocity of the water not allow sufficient air to escape through first orifice $c^3$, the defect is remedied by reducing the orifice $c^4$. The conduit $c'$ with orifices $c^2$—$c^3$—$c^4$, can be simply and easily set to act at any varying pressure say from five pounds to seventy pounds to the square inch. Should the valve G be held open while the cistern is filling the water will displace the air in the air-lock and flow out of the cistern as fast as it flows in, and not necessarily start and maintain siphonic action, but on the valve G being closed the water flowing through the conduit pipe C′ carries with it sufficient air and delivers same in such a position that it will displace the water in the air-lock and so render the cistern in the condition to be flushed.

The action of my apparatus is as follows—The water flowing in through the ball tap $c$ and filling the cistern to the required height $b$, the valve $g$ being closed the trap $d'$ becoming water sealed, and $d^3$ and $i$ being submerged the air in $d^2$ forms a lock which prevents the water flowing through $d'$. The cistern fills to a greater height than the top of the coil, the said height being controlled by the depth of seal in the trap $d'$. On the valve $g$ being sufficiently opened the air is allowed to escape rapidly from $d^2$ the water immediately falls through the coil and pipe $d$ starting and maintaining siphonic action until the cistern is emptied to the required depth through $d^3$. Air is admitted through the pipe $l$ to completely stop siphonic action and to prevent sucking noise.

Having thus described my invention, what I claim and desire to secure by Letters Patent is—

A cistern comprising a trapped pipe having its end opening near the bottom of the cistern, a tube $e$ connected to the top of the trapped pipe, a valve on the free end of said tube, a conduit pipe delivering the water at a point beyond the end of the trapped pipe and having an air inlet port and an outlet port leading to the end of the trapped pipe.

In testimony whereof I have signed my name to this specification in the presence of two subscribing witnesses.

THOMAS SMITH.

Witnesses:
A. HARKER,
HIDER SMITH.